United States Patent
Emery et al.

(10) Patent No.: US 7,468,958 B2
(45) Date of Patent: Dec. 23, 2008

(54) OPTICAL LINE TERMINAL THAT DETECTS AND IDENTIFIES A ROGUE ONT

(75) Inventors: Clayton J. Emery, Davie, FL (US); Richard B. Joerger, Davie, FL (US)

(73) Assignee: Tellabs Petaluma, Inc., Petaluma, CA (US)

( * ) Notice: Subject to any disclaimer, the term of this patent is extended or adjusted under 35 U.S.C. 154(b) by 576 days.

(21) Appl. No.: 11/123,622

(22) Filed: May 6, 2005

(65) Prior Publication Data

US 2006/0268759 A1    Nov. 30, 2006

(51) Int. Cl.
*H04B 7/212* (2006.01)
*H04J 3/26* (2006.01)
*H04L 12/26* (2006.01)

(52) U.S. Cl. .................. 370/321; 370/432; 370/241; 370/242

(58) Field of Classification Search .......... 370/321, 370/432, 241, 242
See application file for complete search history.

(56) References Cited

U.S. PATENT DOCUMENTS

| | | | |
|---|---|---|---|
| 5,790,293 A | 8/1998 | Frigo | 359/173 |
| 7,230,926 B2 * | 6/2007 | Sutherland et al. | 370/241 |
| 7,231,145 B2 * | 6/2007 | Gerstel et al. | 398/17 |
| 2003/0048502 A1 * | 3/2003 | Yu et al. | 359/124 |
| 2005/0237974 A1 * | 10/2005 | Dotaro et al. | 370/329 |
| 2006/0093356 A1 * | 5/2006 | Vereen et al. | 398/33 |
| 2006/0198635 A1 | 9/2006 | Emery et al. | 398/38 |

* cited by examiner

*Primary Examiner*—Barry W Taylor
(74) *Attorney, Agent, or Firm*—Mark C. Pickering

(57) ABSTRACT

An optical line terminal (OLT) determines when an optical network terminal (ONT) has become a rogue ONT, and then identifies the rogue ONT so that service can be restored. The OLT identifies the rogue ONT by comparing the received power levels with the levels that would be expected during normal operation.

19 Claims, 6 Drawing Sheets

OPTICAL LINE TERMINAL THAT DETECTS AND IDENTIFIES A ROGUE ONT

BACKGROUND OF THE INVENTION

1. Field of the Invention

The present invention relates to optical line terminals and, more particularly, to an optical line terminal that detects and identifies a rogue ONT.

2. Description of the Related Art

A fiber-to-the-x (FTTx) passive optical network (PON) is a point-to-multipoint communications network. Examples of an FTTx network include a fiber-to-the curb (FFTC) network and a fiber-to-the-home (FTTH) network. In an FTT-x network, downstream data packets are transmitted from an optical line terminal (OLT) to a number of optical network terminals (ONT) that are located at or near a corresponding number of end users. Upstream data packets, on the other hand, are transmitted from the ONTs back to the OLT.

FIG. 1 shows a block diagram that illustrates a prior-art example of a point-to-multipoint communications network 100. As shown in FIG. 1, network 100 includes an OLT 110, a fiber optic cable 112, and a number of ONTs 114 that are connected to OLT 110 via fiber optic cable 112. Each ONT 114, in turn, is connected to an end user 116.

As further shown in FIG. 1, OLT 110 includes an interface unit 120 that is connected to cable 112, and an optical transmitter 122 that generates and outputs downstream data packets to the ONTs 114 via interface unit 120. In addition, OLT 110 includes an optical receiver 124 that receives upstream data packets from the ONTs 114 via interface unit 120.

OLT 110 also includes a MAC/processor 126 and a memory 128 that is connected to MAC/processor 126. MAC/processor 126 outputs downstream data to optical transmitter 122, and receives upstream data from optical receiver 124. Memory 128, in turn, stores the instructions and data required to operate MAC/processor 126.

In operation, OLT 110 establishes a sequence of transmission timeslots, and assigns transmission timeslots to the ONTs 114 that are connected to fiber optic cable 112. During normal operation, the ONTs 114 transmit data packets to OLT 110 during their assigned timeslots and only during their assigned timeslots.

One problem which can arise is when, due to a hardware or software failure, an ONT 114 transmits at the wrong time. If a first ONT transmits during a time slot which has been assigned to a second ONT and both ONTs attempt to transmit at the same time, a collision results which can prevent OLT 110 from being about to receive the data packets output by either ONT.

Thus, for example, when the optical transmitter of an ONT 114 "sticks on" and continuously transmits during all of the assigned time slots, the entire FTTx network can be rendered incapable of any communication between the ONTs 114 and OLT 110. An ONT that transmits in the upstream direction during the wrong time slot, such as a continuously transmitting ONT, is known as a "rogue ONT".

Thus, in order to prevent a rogue ONT from incapacitating an entire a FTTx network segment, there exists a need for an OLT that can detect when an ONT has become a rogue and is illegally transmitting, and then identify which ONT is the rogue ONT so that service can be restored.

SUMMARY OF THE INVENTION

An optical line terminal (OLT) is disclosed. The OLT is to be connected to a plurality of optical network terminals (ONTs) via a fiber. In addition, each ONT is to have a timeslot during which data can be transmitted to the OLT. The OLT includes an interface unit to be connected to the fiber, and an optical transmitter to generate and output downstream data packets to the ONTs via the interface unit.

The OLT also includes an optical receiver to receive upstream data packets, which have power levels, from the ONTs via the interface unit. Further, the OLT includes a processor to output downstream data to the optical transmitter, and receive upstream data from the optical receiver. In addition, the OLT includes an optical power meter connected to the optical receiver to detect the power levels of the upstream data packets that are received during a sequence of transmission time slots, and to the processor to output a plurality of measured power levels.

A method of operating an optical line terminal (OLT) is also disclosed according to an embodiment of the invention. The OLT is to be connected to a plurality of optical network terminals (ONTs) via a fiber. In addition, each ONT is to have a timeslot during which data can be transmitted to the OLT.

In the method, a database of received power levels is formed for all of the ONTs that are connected to the OLT via the fiber so that an expected power level can be determined for each ONT that is connected to the OLT via the fiber. Further, a rogue ONT is detected if an ONT becomes a rogue. In addition, the rogue ONT is identified after the rogue ONT has been detected.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 1:
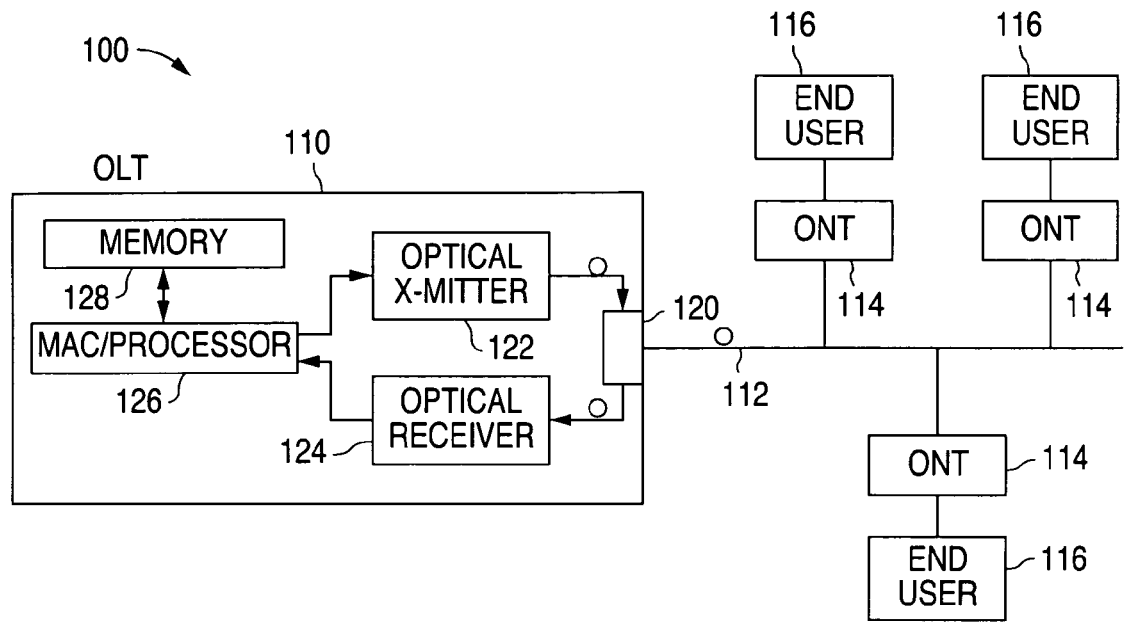
FIG. 1 is a block diagram illustrating a prior-art example of a point-to-multipoint communications network 100.
Figure 2:
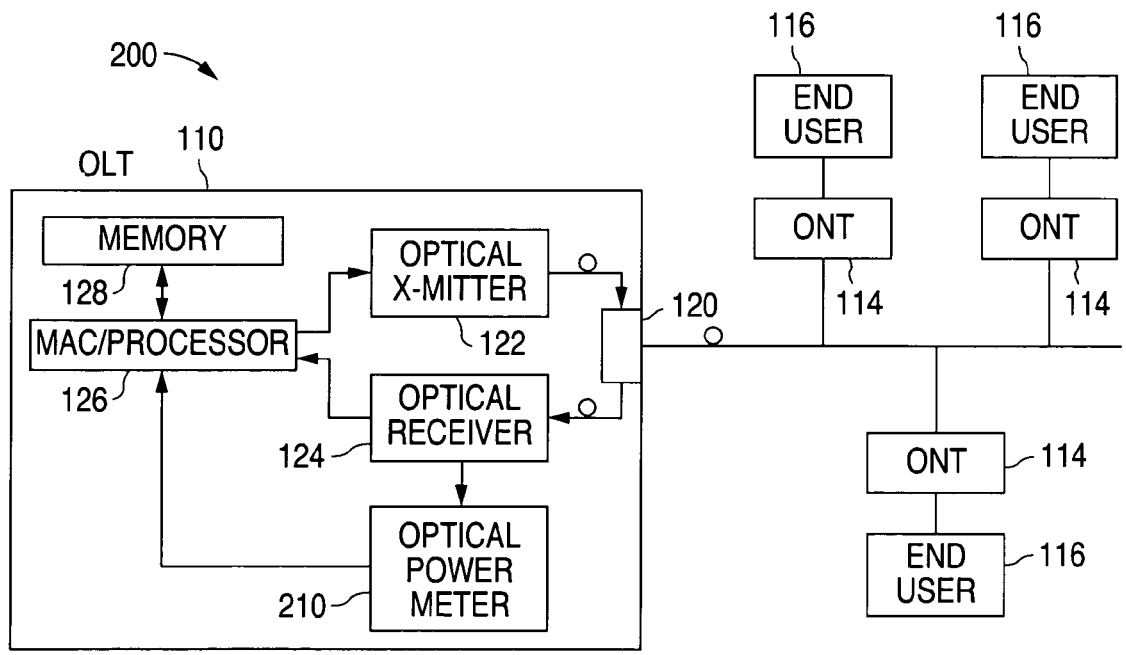
FIG. 2 is a block diagram illustrating an example of a point-to-multipoint communications network 200 in accordance with the present invention.

FIG. 2 shows a block diagram that illustrates an example of a point-to-multipoint communications network 200 in accordance with the present invention. Network 200 is similar to network 100 and, as a result, utilizes the same reference numerals to designate the structures which are common to both networks.

As shown in FIG. 2, communications network 200 differs from network 100 in that OLT 110 of network 200 includes an optical power meter 210 that is connected to optical receiver 124 to detect the power levels of the data packets that are received during a sequence of transmission time slots, and to MAC/processor 126 to output a sequence of measured power levels.

Figure 3:
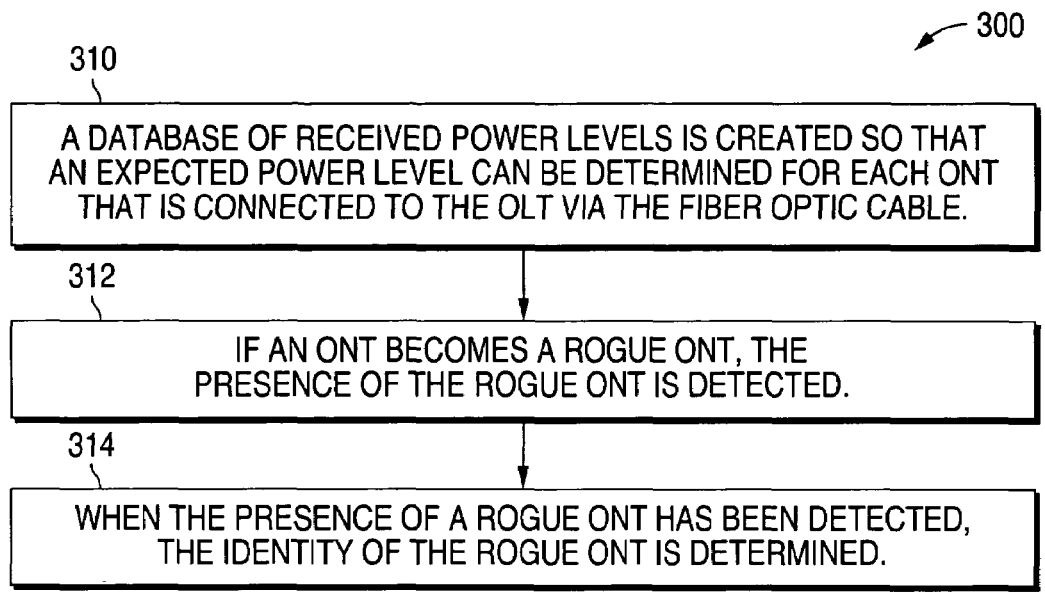
FIG. 3 is a flow chart illustrating an example of a method 300 of operating an OLT in accordance with the present invention.

FIG. 3 shows a flow chart that illustrates an example of a method 300 of operating an OLT in accordance with the present invention. Software implementing method 300 can be executed by MAC/processor 126, and stored in memory 128. As shown in FIG. 3, at 310, a database of measured power levels is created so that an expected power level can be determined for each ONT that is connected to the OLT via the fiber optic cable.

Figure 4:
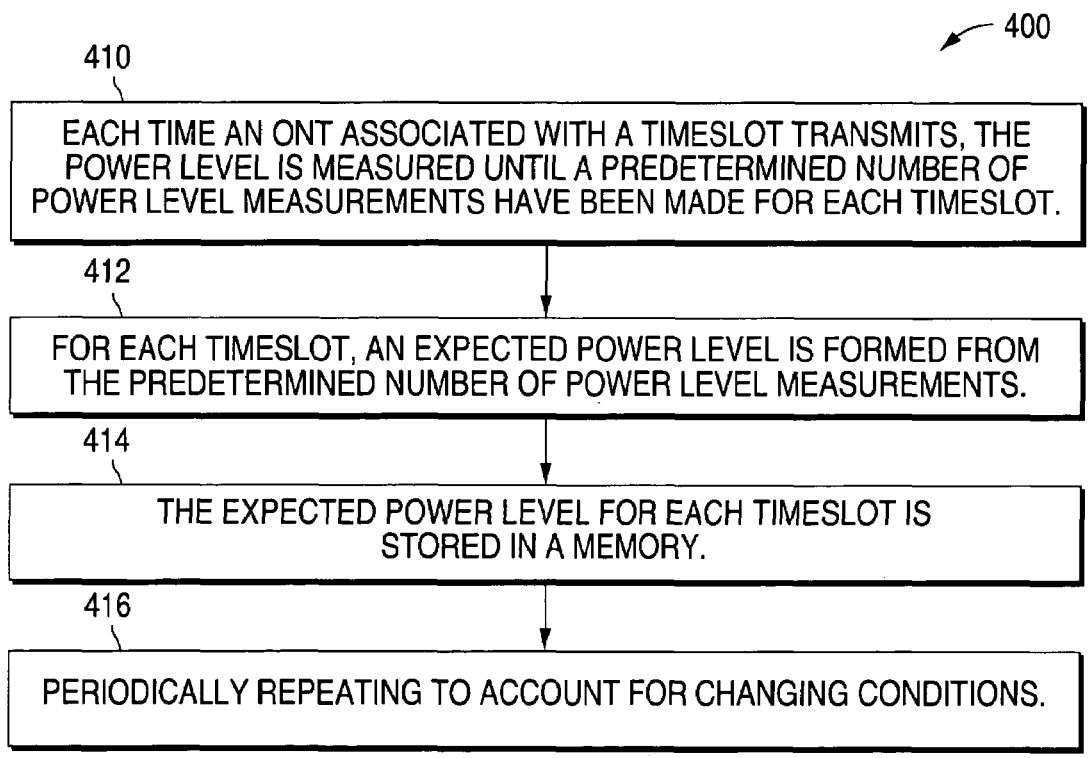
FIG. 4 is a flow chart illustrating an example of a method 400 of creating a database of measured power levels in accordance with the present invention.

FIG. 4 shows a flow chart that illustrates an example of a method 400 of creating a database of measured power levels in accordance with the present invention. As shown in FIG. 4, at 410, each time an ONT associated with a timeslot transmits, the power level is measured until a predetermined number of power levels measurements have been made for each timeslot.

As further shown in FIG. 4, at 412, for each timeslot, an expected power level is formed from the predetermined number of power level measurements. For example, the predetermined number of power level measurements can be averaged, or otherwise weighted and combined, to form the expected power level to reduce the effect of any transitory power spikes.

At 414, the expected power level for each timeslot is stored in a memory, such as memory 128. In addition, at 416, method 400 is periodically repeated to account for changing conditions, such as temperature. When repeated, the old value can be replaced by the new value, or the old and new values can be averaged together or otherwise weighted and combined to form the value stored in memory 128.

Referring again to FIG. 3, at 312, if an ONT becomes a rogue ONT, the presence of the rogue ONT is detected. A rogue ONT can be detected in a number of ways. For example, whenever two ONTs with relatively similar power levels, as seen by the OLT, transmit at the same time, the signals received by the OLT are largely unrecoverable. Thus, the regular presence of wholly or partially unrecoverable data packets can be taken to indicate the presence of a rogue ONT.

Figure 5:
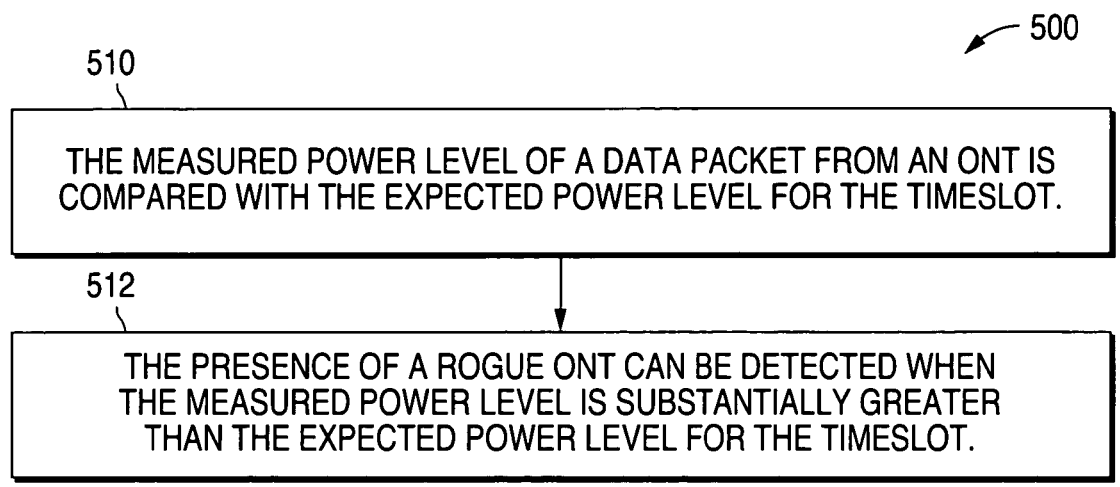
FIG. 5 is a flow chart illustrating an example of a method 500 of detecting the presence of a rogue ONT in accordance with the present invention.

A rogue ONT can also be detected from the power levels. FIG. 5 shows a flow chart that illustrates an example of a method 500 of detecting the presence of a rogue ONT in accordance with the present invention. As shown in FIG. 5, at 510, the measured power level of a data packet from an ONT is compared with the expected power level for the timeslot.

Following this, at 512, the presence of a rogue ONT can be detected when the measured power level is substantially greater than the expected power level for the timeslot. This is because when a rogue ONT is transmitting, two ONTs are transmitting at the same time (the ONT which is supposed to transmit during the timeslot and the rogue ONT).

Next, at 314, when the presence of a rogue ONT has been detected, the identity of the rogue ONT is determined. Once the identity of the rogue ONT has been determined, the ONT can be turned off if it is still obeying commands, or a service truck can be dispatched if it is no longer obeying commands. As a result, the amount of time that the network is impacted by the rogue ONT can be minimized.

Figure 6A:
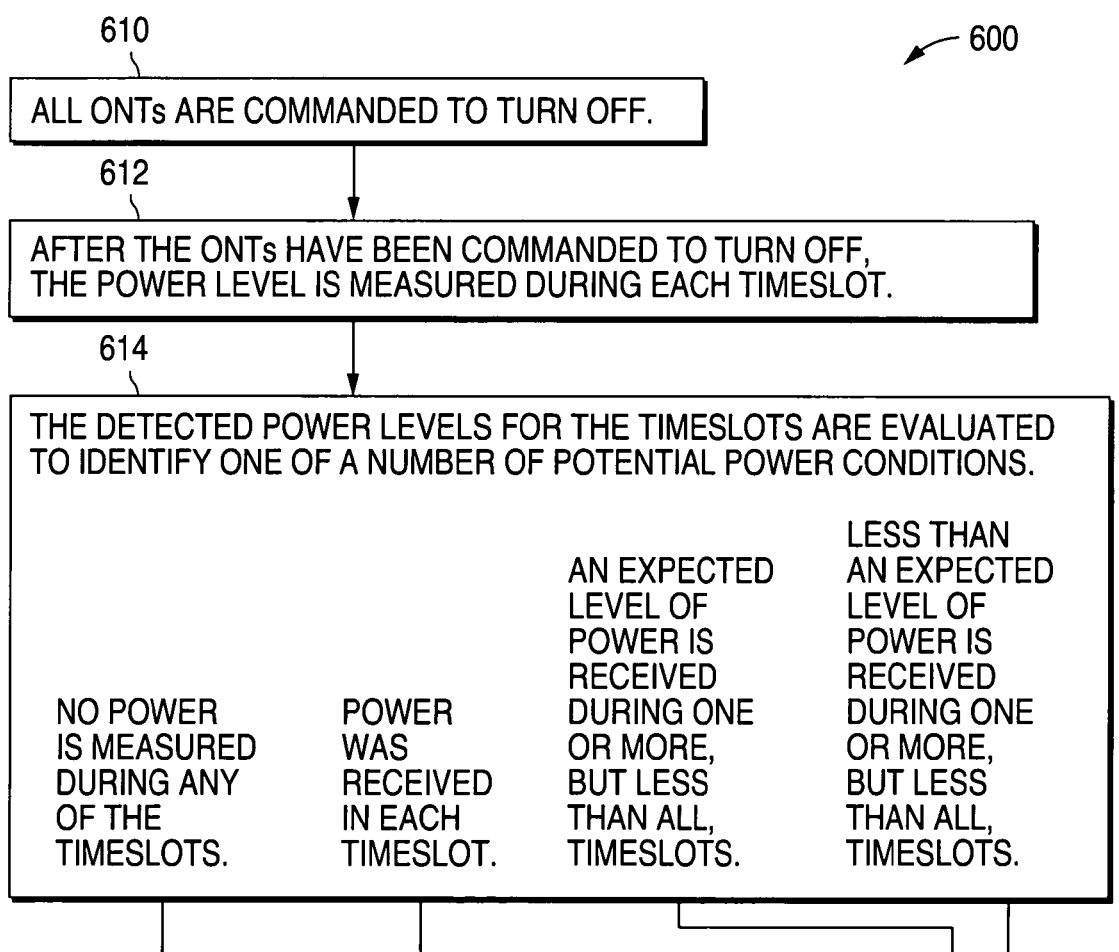
FIGS. 6A-6C are a flow chart illustrating an example of a method 600 of identifying a rogue ONT in accordance with the present invention.
Figure 6B:
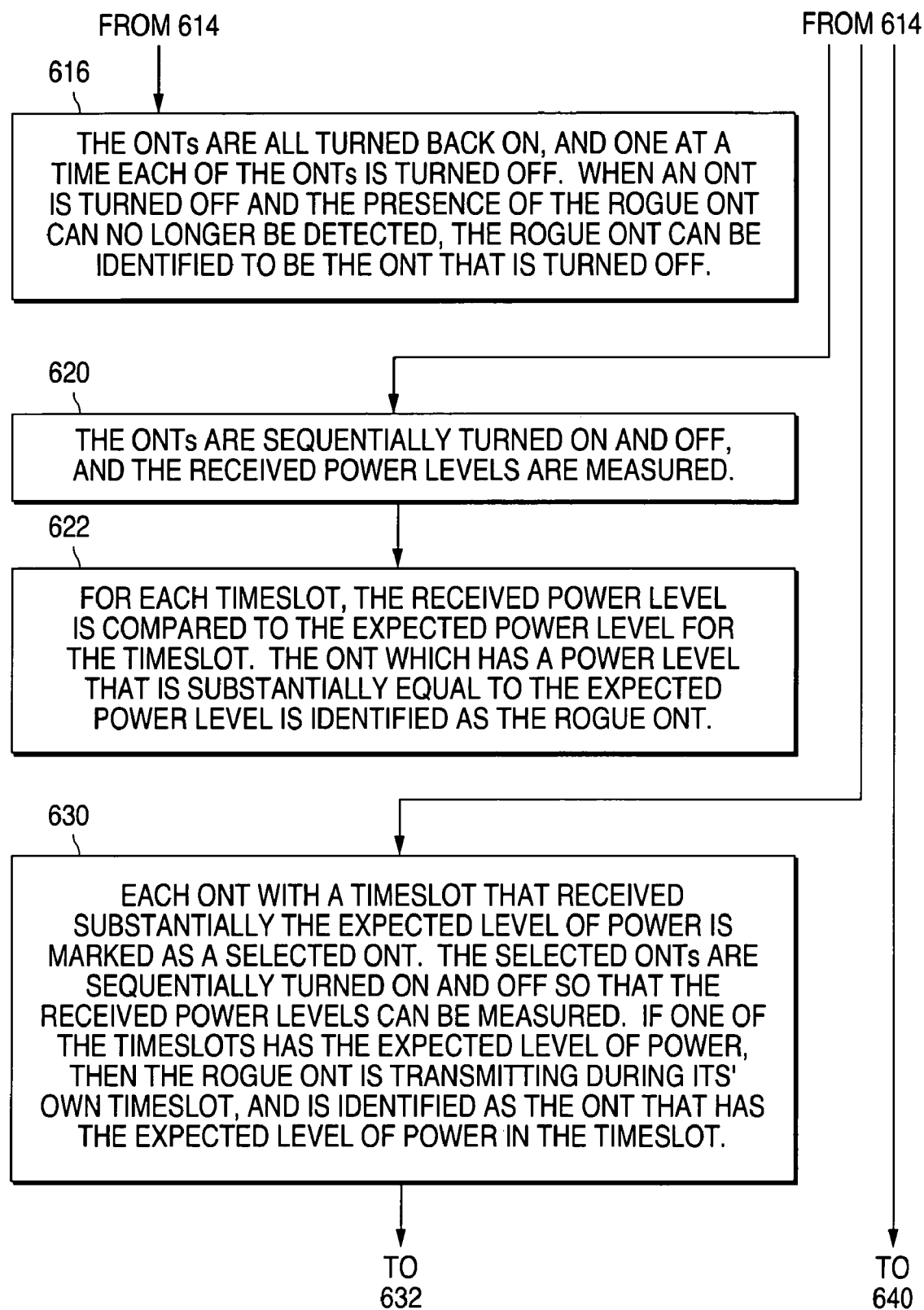
Figure 6C:
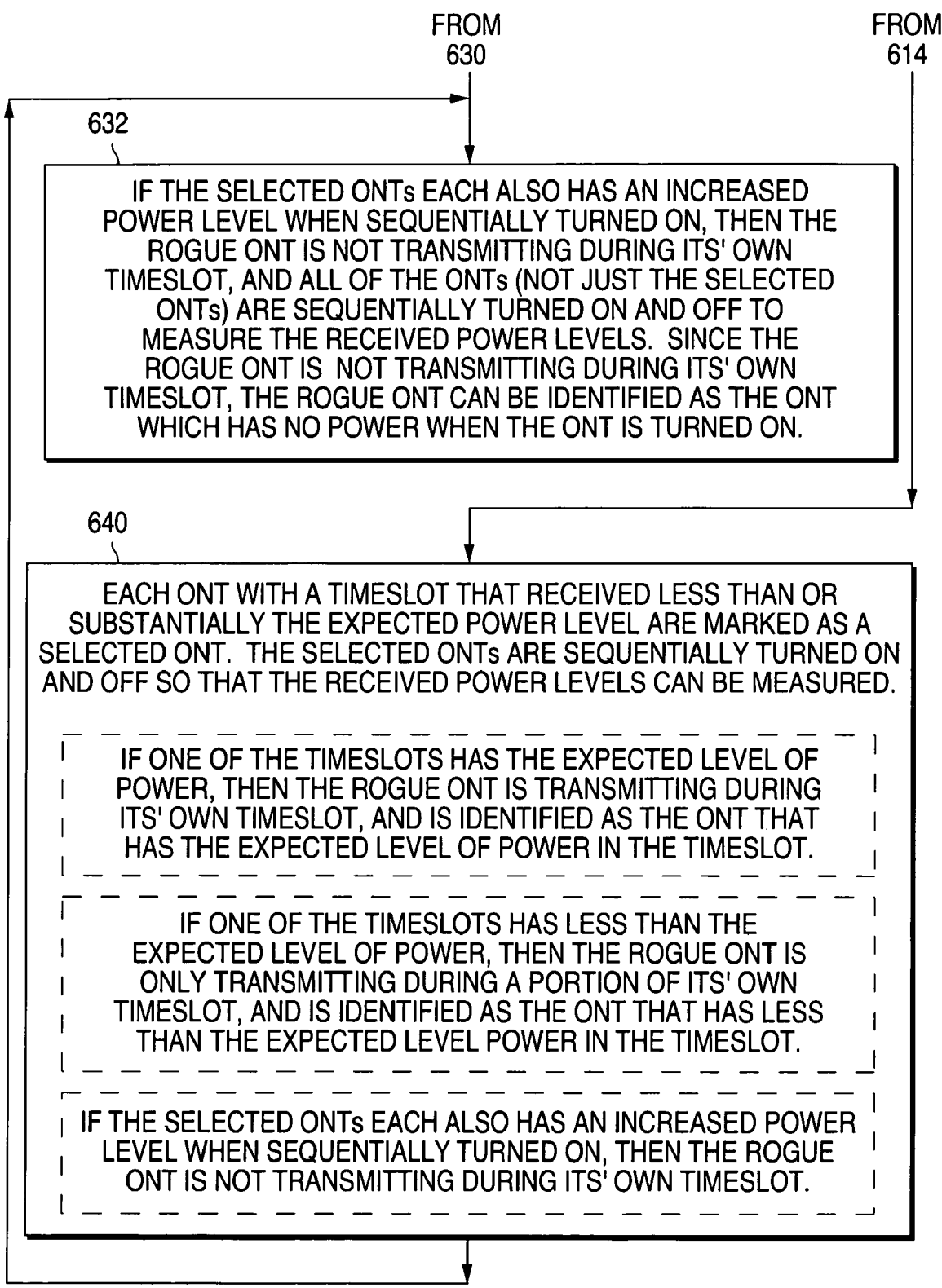

FIGS. 6A-6C show a flow chart that illustrates an example of a method 600 of identifying a rogue ONT in accordance with the present invention. As shown in FIGS. 6A-6C, at 610, all ONTs are commanded to turn off. For example, MAC/processor 126 can command all ONTs 114 connected to fiber 112 to turn off.

After the ONTs have been commanded to turn off, the power level is measured during each timeslot in 612. Since the ONTs have been turned off, the detected power should be zero, i.e., no power should be detected. However, when a rogue ONT is present, the detected power can also be less than the expected power level, equal to the expected power level, or more than the expected power level for the timeslot.

At 614, the detected power levels for the timeslots are evaluated to identify one of a number of potential power conditions. One potential power condition which can be identified is when no power is measured during any of the timeslots. This condition can arise if the rogue ONT turns off in response to the OLT command to turn off which, in turn, indicates that the rogue ONT is still responding to commands from the OLT.

In this case, at 616, the ONTs are all turned back on, and one at a time each of the ONTs is turned off. When an ONT is turned off, it is determined whether or not the presence of the rogue ONT can still be detected. When the presence of the rogue ONT can no longer be detected, the rogue ONT can be identified to be the ONT that is currently turned off.

Another potential power condition which can be identified is when the rogue ONT continuously transmits. When the rogue ONT continuously transmits, power is received during each timeslot. FIGS. 7A-7G are timing diagrams that illustrate a number of examples of rogue ONT signals in accordance with the present invention. In each of the figures, the ONT that transmits during the fifth timeslot is the rogue ONT.

Figure 7A:
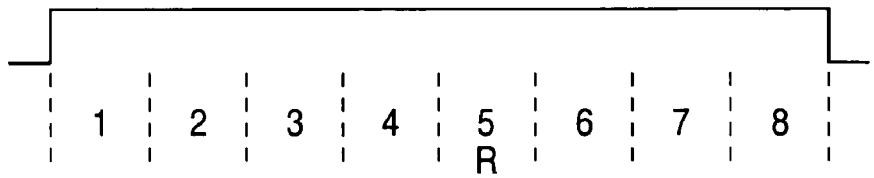
FIGS. 7A-7G are timing diagrams illustrating a number of examples of rogue ONT signals in accordance with the present invention.

FIG. 7A shows a timing diagram that illustrates a continuously transmitting rogue ONT in accordance with the present invention. As shown in FIG. 7A, although all of the ONTs have been commanded to turn off, power is nonetheless received during each timeslot of the sequence of timeslots.

When in 614 it is determined that the rogue ONT is continuously transmitting (power was received in each timeslot), the ONTs are sequentially turned on and off, and the received power levels are measured in 620. In 622, for each timeslot, the received power level is compared to the expected power level for the timeslot.

In this case, the timeslots will have a measured power level that is either greater than the expected power level (the sum of the ONT commanded to transmit and the rogue ONT which is continuously transmitting), or substantially equal to the expected power level (only the rogue ONT transmits during its' assigned timeslot). Thus, in 622, the ONT which has a power level that is substantially equal to the expected power level is identified as the rogue ONT.

Referring again to 614, another potential power condition which can be identified is when the rogue ONT transmits so that an expected level of power is received during one or more, but less than all, of the timeslots when the ONTs were commanded to be off. In addition, in one case the rogue ONT transmits during its' own timeslot, while in another case the rogue ONT does not transmit during its' own timeslot.

Figure 7B:
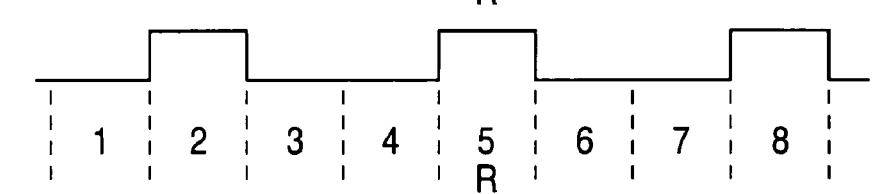
Figure 7C:
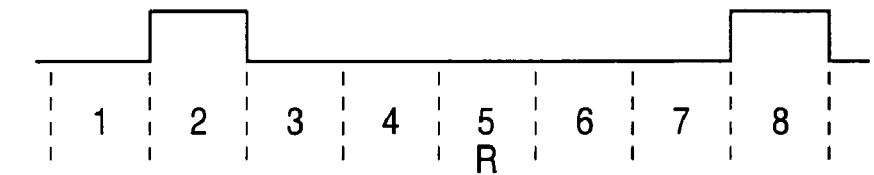

FIGS. 7B-7C show timing diagrams that illustrate a rogue ONT that transmits an expected level of power during one or more, but less than all, of the timeslots in accordance with the present invention. FIG. 7B shows the case where the rogue ONT transmits during its' own timeslot, while FIG. 7C shows the case where the rogue ONT does not transmit during its' own timeslot. Thus, as shown in FIGS. 7B-7C, although all of the ONTs have been commanded to turn off, an expected level of power is nonetheless received during a number of timeslots of the sequence of timeslots.

When in 614 it is determined that the expected level of power was received in a number of timeslots, in 630 each ONT with a timeslot that received substantially the expected level of power is marked as a selected ONT. In 630, the selected ONTs are sequentially turned on and off so that the received power levels can be measured. If in 630 the selected ONTs each also has an increased power level when sequentially turned on, then the rogue ONT is not transmitting during its' own timeslot as shown in FIG. 7C.

When in 630 it is determined that the rogue ONT is not transmitting during its' own timeslot (an increased power level is measured from each selected ONT), all of the ONTs (not just the selected ONTs) are sequentially turned on and off in 632 to measure the received power levels. Since the rogue ONT is not transmitting during its' own timeslot, the rogue ONT can be identified as the ONT which has no power when the ONT is turned on in 632.

On the other hand, if one of the timeslots in 630 has the expected level of power, then the rogue ONT is transmitting during its' own timeslot as shown in FIG. 7B, and is identified as the ONT that has the expected level of power in the timeslot. This is because only the rogue ONT transmits during its' own timeslot, while both the rogue ONT and the commanded ONT transmit together during the remaining timeslots.

Referring again to 614, another potential power condition which can be identified is when the rogue ONT transmits so that less than an expected level of power is received during one or more, but less than all, of the timeslots when the ONTs were commanded to be off. In addition, in a first case, the rogue ONT transmits during its' own timeslot, while in a second case the rogue ONT does not transmit during its' own timeslot. Further, in a third case, the rogue ONT transmits more in an adjacent timeslot and less in its' own timeslot, while in a fourth case the rogue ONT transmits less in an adjacent timeslot and more in its' own timeslot.

Figure 7D:
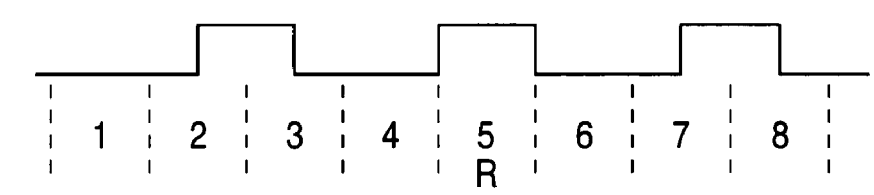
Figure 7E:
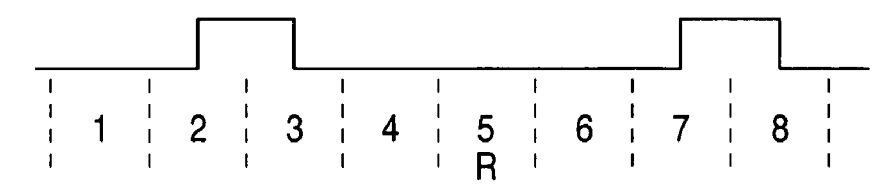
Figure 7F:
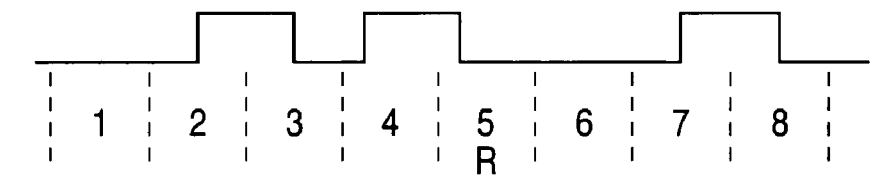
Figure 7G:
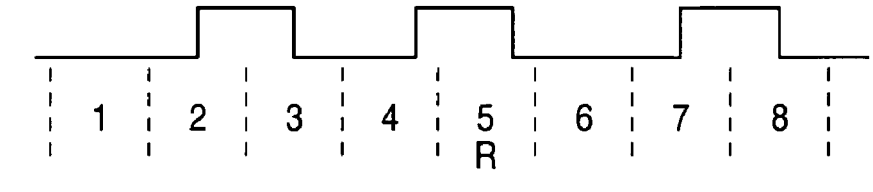

FIGS. 7D-7G show timing diagrams that illustrate a rogue ONT that transmits less than an expected level of power during one or more timeslots in accordance with the present invention. FIG. 7D shows the case where the rogue ONT transmits during its' own timeslot, while FIG. 7E shows the case where the rogue ONT does not transmit during its' own timeslot. FIG. 7F shows the case where the rogue ONT transmits more in an adjacent timeslot and less in its' own timeslot, while FIG. 7G shows the case where the rogue ONT transmits less in an adjacent timeslot and more in its' own timeslot.

When in 614 it is determined that the expected level of power was received in a number of timeslots, in 640 each ONT with a timeslot that received less than or substantially the expected power level are marked as a selected ONT. In 640, the selected ONTs are sequentially turned on and off so that the received power levels can be measured. If in 640 the selected ONTs each also has an increased power level when sequentially turned on, then the rogue ONT is not transmitting during its' own timeslot as shown in FIG. 7E.

When in 640 it is determined that the rogue ONT is not transmitting during its' own time slot (an increased power level is measured from each selected ONT), all of the ONTs are sequentially turned on and off to measure the received power levels in 632. Since the rogue ONT is not transmitting during its' own timeslot, the rogue ONT is identified as the ONT which has no power when the ONT are sequentially turned on in 632.

In addition, if one of the timeslots in 640 has the expected level of power, then the rogue ONT is transmitting during its' own timeslot as shown in FIG. 7D, and is identified as the ONT that has the expected level of power in the timeslot. This is because only the rogue ONT is transmitting during its' own timeslot, while both the rogue ONT and the commanded ONT transmit together during a portion of the remaining timeslots.

Further, if one of the timeslots in 640 has less than the expected level of power, then the rogue ONT is only transmitting during a portion of its' own timeslot as shown in FIGS. 7F and 7G, and is identified as the ONT that has less than the expected level of power in the timeslot. This is because only the rogue ONT is transmitting during its' own timeslot, and when the rogue ONT stops early or starts late, less than the expected power level is detected.

Thus, an OLT and a method of operating an OLT have been disclosed that detects when an ONT has become a rogue, and then identifies the rogue ONT so that service can be restored.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. An optical line terminal (OLT) to be connected to a plurality of optical network terminals (ONTs) via a fiber, each ONT to have a timeslot during which data can be transmitted to the OLT, the OLT comprising:
   an interface unit to be connected to the fiber;
   an optical transmitter to generate and output downstream data packets to the ONTs via the interface unit;
   an optical receiver to receive upstream data packets from the ONTs via the interface unit, the upstream data packets having power levels;
   an optical power meter connected to the optical receiver to detect the power levels of the upstream data packets that are received during a sequence of transmission time slots, the optical power meter to output a plurality of measured power levels in response to detecting the power levels of the upstream data packets; and
   a processor connected to the optical transmitter, the optical receiver, and the optical power meter, the processor to:
      receive the plurality of measured power levels from the optical power meter;
      output downstream data to the optical transmitter, and receive upstream data from the optical receiver;
      form a database of measured power levels for all of the ONTs that are connected to the OLT via the fiber so that an expected power level can be determined for each ONT that is connected to the OLT via the fiber;
      detect a rogue ONT if a rogue is present; and
      identify the rogue ONT after the rogue ONT has been detected, to identify the rogue ONT, the processor to:
         command all of the ONTs to turn off; and
         measure a power level during each timeslot after the ONTs have been commanded to turn off.

2. The OLT of claim 1, wherein the processor:
   determines if power was received during each timeslot when the ONTs were commanded to be off;
   sequentially turns on and off each ONT to measure a received power level if power was received during each time slot when the ONTs were commanded to be off;
   for each ONT, compares the received power level for an ONT to the expected power level for the ONT; and
   identifies an ONT that has a received power level and an expected power level that are substantially equal as a rogue ONT.

3. The OLT of claim 1, wherein the processor:
   determines if a level of power was received during a number of timeslots that is less than all of the timeslots when the ONTs were commanded to be off;

marks each ONT with a timeslot that received a level of power as a selected ONT; and sequentially turns on and off each selected ONT to measure a received power level for each selected ONT.

4. The OLT of claim 3, wherein, when an increased power level is measured from each selected ONT, the processor:

sequentially turns on and off all of the ONTs to measure a received power level; and identifies an ONT that has no power when sequentially turned on as a rogue ONT.

5. The OLT of claim 3, wherein, when a received power level is substantially equal to or less than an expected power level of a selected ONT, the processor identifies the selected ONT that has a received power level that is substantially equal to or less than an expected power level as a rogue ONT.

6. The OLT of claim 3, wherein when the received power level from one of the selected ONTs is less than the expected level of power, the processor identifies as a rogue ONT the selected ONT that has less than the expected power level.

7. The OLT of claim 1, wherein when no power is measured during any timeslot when all of the ONTs have been commanded to turn off, the processor to:

turn on all ONTs and then sequentially turn off and on each ONT;

while each ONT is turned off, seek to detect a presence of a rogue ONT; and identify a turned off ONT as a rogue ONT when the presence of the rogue ONT can no longer be detected.

8. method of operating an optical line terminal (OLT), the OLT to be connected to a plurality of optical network terminals (ONTs) via a fiber, each ONT to have a timeslot during which data can be transmitted to the OLT, the method comprising:

forming a database of measured power levels for all of the ONTs that are connected to the OLT via the fiber so that an expected power level can be determined for each ONT that is connected to the OLT via the fiber;

detecting a rogue ONT if a rogue is present; and identifying the rogue ONT after the rogue ONT has been detected by:

commanding all of the ONTs to turn off; and measuring a power level during each timeslot after the ONTs have been commanded to turn off.

9. The method of claim 8, wherein forming a database further includes:

measuring a power level each time an ONT associated with a timeslot transmits until a predetermined number of power level measurements have been made for each ONT;

for each ONT, forming the expected power level from the predetermined number of power level measurements; and storing the expected power level for each ONT.

10. The method of claim 8, wherein detecting a rogue ONT comprises:

comparing a received power level with the expected power level for an ONT; and detecting a presence of a rogue ONT when the received power level is substantially greater than the expected power level for the ONT.

11. The method of claim 8, further comprising:

determining if power was received during each timeslot when the ONTs were commanded to be off;

sequentially turning on and off each ONT to measure a received power level if power was received during each time slot when the ONTs were commanded to be off;

for each ONT, comparing the received power level for an ONT to the expected power level for the ONT; and identifying an ONT that has a received power level and an expected power level that are substantially equal as a rogue ONT.

12. The method of claim 8, further comprising:

determining if a level of power was received during a number of timeslots when the ONTs were commanded to be off, the number of timeslots being less than all of the timeslots;

marking each ONT with a timeslot that received a level of power as a selected ONT; and sequentially turning on and off each selected ONT to measure a received power level for each selected ONT.

13. The method of claim 12, further comprising:

when an increased power level is measured from each selected ONT, sequentially turning on and off all of the ONTs to measure a received power level; and identifying an ONT that has no power when sequentially turned on as a rogue ONT.

14. The method of claim 12, further comprising when a received power level is substantially equal to or less than an expected power level of a selected ONT, identifying the selected ONT that has a received power level that is substantially equal to or less than an expected power level as a rogue ONT.

15. The method of claim 12, further comprising if the received power level from one of the selected ONTs is less than the expected level of power, then the rogue ONT is identified as the selected ONT that has less than the expected power level.

16. The method of claim 8, wherein when no power is measured during any timeslot when all of the ONTs have been commanded to turn off:

turning on all ONTs and then sequentially turning off and on each ONT;

while each ONT is turned off, seeking to detect a presence of a rogue ONT; and identifying a turned off ONT as a rogue ONT when the presence of a rogue ONT can no longer be detected.

17. A method of identifying a rogue optical network terminal (ONT) from a plurality of ONTs that are connected to a common node, each of the plurality of ONTs to transmit during an assigned timeslot, the method comprising:

commanding all of the ONTs to turn off;

measuring a power level during each assigned timeslot after the ONTs have been commanded to turn off; and when no power is measured during any timeslot when all of the ONTs have been commanded to turn off, turning on all ONTs and then sequentially turning off and on each ONT;

while each ONT is turned off, seeking to detect the presence of a rogue ONT; and identifying the rogue ONT as the ONT that is turned off when the presence of the rogue ONT can no longer be detected.

18. A method of identifying a rogue optical network terminal (ONT) from a plurality of ONTs that are connected to a common node, each of the plurality of ONTs to transmit during an assigned timeslot, the method comprising:

commanding all of the ONTs to turn off;

measuring a cower level during each assigned timeslot after the ONTs have been commanded to turn off; and when power was received during each timeslot when the ONTs were commanded to be off, sequentially turning on and off each ONT to measure a received power level;

for each ONT, comparing the received power level of an ONT to an expected power level for the ONT; and identifying the rogue ONT to be the ONT that has a received power level that is substantially equal to the expected power level for the ONT.

19. A method of identifying a rogue optical network terminal (ONT) from a plurality of ONTs that are connected to a common node, each of the plurality of ONTs to transmit during an assigned timeslot, the method comprising:

commanding all of the ONTs to turn off;

measuring a cower level during each assigned timeslot after the ONTs have been commanded to turn off; and when power was received during a few timeslots when the ONTs were commanded to be off, marking each ONT with a timeslot that received a level of power as a selected ONT; and sequentially turning on and off each selected ONT to measure a received power level.

* * * * *

UNITED STATES PATENT AND TRADEMARK OFFICE
CERTIFICATE OF CORRECTION

PATENT NO.       : 7,468,958 B2  
APPLICATION NO.  : 11/123622  
DATED            : December 23, 2008  
INVENTOR(S)      : Emery et al.

Page 1 of 1

It is certified that error appears in the above-identified patent and that said Letters Patent is hereby corrected as shown below:

Column 1, line 13, delete "(FFTC)" and replace with --(FTTC)--.

Column 8, line 62, delete "cower" and replace with --power--.

Column 10, line 1, delete "cower" and replace with --power--.

Signed and Sealed this

Tenth Day of February, 2009

JOHN DOLL  
*Acting Director of the United States Patent and Trademark Office*